United States Patent
Shnitzer (10) Patent No.: US 10,020,947 B2
(45) Date of Patent: Jul. 10, 2018

(54) FORMAT CONVERSION OF DIGITALLY SIGNED FILES

(71) Applicant: Re-Sec Technologies LTD., Pardes-Hana (IL)

(72) Inventor: Oren Shnitzer, Pardes-Hana (IL)

(73) Assignee: ReSec Technologies Ltd., Caesarea (IL)

( * ) Notice: Subject to any disclaimer, the term of this patent is extended or adjusted under 35 U.S.C. 154(b) by 276 days.

(21) Appl. No.: 15/095,198

(22) Filed: Apr. 11, 2016

(65) Prior Publication Data

US 2017/0295022 A1   Oct. 12, 2017

(51) Int. Cl.
*G06F 17/30* (2006.01)
*H04L 9/32* (2006.01)

(52) U.S. Cl.
CPC ...... *H04L 9/3247* (2013.01); *G06F 17/30076* (2013.01); *H04L 9/3268* (2013.01)

(58) Field of Classification Search
CPC .............................. H04L 9/3268; G06F 17/30
USPC ......................................................... 713/176
See application file for complete search history.

(56) References Cited

U.S. PATENT DOCUMENTS

| 2007/0174551 A1* | 7/2007 | Cornwell | G06F 12/0888 711/118 |
| --- | --- | --- | --- |
| 2011/0107018 A1* | 5/2011 | Honda | G06F 3/0607 711/103 |

* cited by examiner

*Primary Examiner* — Evans Desrosiers
(74) *Attorney, Agent, or Firm* — Reches Patents (57) ABSTRACT

A method for file conversion that includes receiving a first file in a computer; wherein the first file is of a first format; wherein the computer has a memory having a boot sector, a quarantine sector and a non-quarantine sector; storing the first file at the quarantine sector; wherein the quarantine sector is isolated from the boot sector and the non-quarantine sector, where code in the quarantine sector is prevented from performing write actions on other memory sectors of the memory; checking whether the first file fulfills a set of criteria that comprise: (a) the first file is associated with a valid first digital signature that was generated by a first certificate authority and is of a known format; (b) the first file is about to be converted to a second file of a second format that supports digital signatures; and (c) the first file successfully passed at least one security check; converting the first file to the second file of the second format; generating, by a second certificate authority, a second digital signature of the second file when the first file fulfills the set of criteria; and storing the second file and the second digital signature at the non-quarantine sector.

21 Claims, 7 Drawing Sheets

FORMAT CONVERSION OF DIGITALLY SIGNED FILES

BACKGROUND

Digital identifiers (Digital IDs), also known as digital certificates, can be used to validate the identity of the author of an electronic document. They can also be used to help protect messages by adding a unique code to the message called a digital signature. A digitally signed message proves to the recipient that you, not an imposter, signed the contents of the message, and that the contents haven't been altered in transit.

Digital signature ensures the authenticity of a document. They are a vital part of business transactions today because: (a) they establish a trust relationship between recipient of a digital document and the author—to be sure that a specific document was indeed created by a specific person or entity and that was not modified; (b) they provide an irrevocable legal proof regarding the author of a document.

Signed document are being used today for contracts, invoices, and so forth. Without using digital signatures there is no way to validate electronic transactions.

Specific sample file formats that support digital signatures are PDF documents, and Microsoft office documents.

Signing certificate—To create a digital signature, you need a signing certificate, which proves identity. When you send a digitally-signed macro or document, you also send your certificate and public key. Certificates are issued by a certification authority. A certificate is usually valid for a year, after which, the signer must renew, or get a new, signing certificate to establish identity.

Certificate authority (CA)—A certificate authority is an entity similar to a notary public. It issues digital certificates, signs certificates to verify their validity and tracks which certificates have been revoked or have expired.

Digital Signature Assurance

The following terms and definitions show what assurances are provided by digital signatures: (a) Authenticity The signer is confirmed as the signer; (b) Integrity The content has not been changed or tampered with since it was digitally signed; (c) Non-repudiation Proves to all parties the origin of the signed content. Repudiation refers to the act of a signer denying any association with the signed content; and (d) Notarization Signatures in Microsoft Word, Microsoft Excel, or Microsoft PowerPoint files, which are time stamped by a secure time-stamp server, under certain circumstances, have the validity of a notarization To make these assurances, the content creator must digitally sign the content by using a signature that satisfies the following criteria: (a) The digital signature is valid; (b) The certificate associated with the digital signature is current (not expired); and (c) The signing person or organization, known as the publisher, is trusted.

It should be noted that signed documents, which have a valid time stamp, are considered to have valid signatures, regardless of the age of the signing certificate.

The certificate associated with the digital signature is issued to the signing publisher by a reputable certificate authority (CA).

SUMMARY

According to an embodiment of the invention there may be provided a method for file conversion that may include receiving a first file in a computer; wherein the first file is of a first format; wherein the computer has a memory having a boot sector, a quarantine sector and a non-quarantine sector; storing the first file at the quarantine sector; wherein the quarantine sector is isolated from the boot sector and the non-quarantine sector, where code in the quarantine sector is prevented from performing write actions on other memory sectors of the memory; checking whether the first file fulfills a set of criteria that comprise (a) the first file is associated with a valid first digital signature that was generated by a first certificate authority and is of a known format; (b) the first file is about to be converted to a second file of a second format that supports digital signatures; and (c) the first file successfully passed at least one security check; converting the first file to the second file of the second format; generating, by a second certificate authority, a second digital signature of the second file when the first file fulfills the set of criteria; and storing the second file and the second digital signature at the non-quarantine sector.

The method may include converting the first file to the second file of the second format without generating the second digital signature of the second file when the first file successfully passed at least one security check but the second format does not support digital signatures.

The method may include converting the first file to the second file of the second format without generating the second digital signature of the second file when the first file successfully passed at least one security check but the first file is associated with an invalid first digital signature.

The method may include converting the first file to the second file of the second format without generating the second digital signature of the second file when the first file successfully passed at least one security check but the first file is associated with a first digital signature of an unknown format.

The method may include copying to the non-quarantine sector at least a part of the first digital signature.

The method may include writing to the non-quarantine sector information about at least a part of the first digital signature without copying to the at least part of the first digital signature to the non-quarantine sector.

The method wherein the converting of the first file to the second file of the second format may include converting the first file to an intermediate file of an intermediate format and converting the intermediate file of an intermediate format to the second file of the second format.

According to an embodiment of the invention there may be provided a non-transitory computer readable medium that stores instructions that once executed by a computer causes the computer to execute the steps of receiving a first file in the computer; wherein the first file is of a first format; wherein the computer has a memory having a boot sector, a quarantine sector and a non-quarantine sector; storing the first file at the quarantine sector; wherein the quarantine sector is isolated from the boot sector and the non-quarantine sector, where code in the quarantine sector is prevented from performing write actions on other memory sectors of the memory; checking whether the first file fulfills a set of criteria that comprise (a) the first file is associated with a valid first digital signature that was generated by a first certificate authority and is of a known format; (b) the first file is about to be converted to a second file of a second format that supports digital signatures; and (c) the first file successfully passed at least one security check; converting the first file to the second file of the second format; generating, by a second certificate authority, a second digital signature of the second file when the first file fulfills the set of criteria; and storing the second file and the second digital signature at the non-quarantine sector.

The non-transitory computer readable medium may store instructions for converting the first file to the second file of the second format without generating the second digital signature of the second file when the first file successfully passed at least one security check but the second format does not support digital signatures.

The non-transitory computer readable medium may store instructions for converting the first file to the second file of the second format without generating the second digital signature of the second file when the first file successfully passed at least one security check but the first file is associated with an invalid first digital signature.

The non-transitory computer readable medium may store instructions for converting the first file to the second file of the second format without generating the second digital signature of the second file when the first file successfully passed at least one security check but the first file is associated with a first digital signature of an unknown format.

The non-transitory computer readable medium may store instructions for copying to the non-quarantine sector at least a part of the first digital signature.

The non-transitory computer readable medium may store instructions for writing to the non-quarantine sector information about at least a part of the first digital signature without copying to the at least part of the first digital signature to the non-quarantine sector.

The non-transitory computer readable medium wherein the converting of the first file to the second file of the second format may include converting the first file to an intermediate file of an intermediate format and converting the intermediate file of an intermediate format to the second file of the second format.

According to an embodiment of the invention there may be provided a computer that may include a memory having a boot sector, a quarantine sector and a non-quarantine sector; wherein the quarantine sector is isolated from the boot sector and the non-quarantine sector, where code in the quarantine sector is prevented from performing write actions on other memory sectors of the memory; a processor; wherein the memory is configured to receive a first file and store the first file at the quarantine sector; wherein the first file is of a first format; wherein the processor is configured to check whether the first file fulfills a set of criteria that comprise (a) the first file is associated with a valid first digital signature that was generated by a first certificate authority and is of a known format; (b) the first file is about to be converted to a second file of a second format that supports digital signatures; and (c) the first file successfully passed at least one security check; convert the first file to the second file of the second format; generate, using a second certificate authority, a second digital signature of the second file when the first file fulfills the set of criteria; and wherein the memory is configured to store the second file and the second digital signature at the non-quarantine sector.

The processor may be configured to convert the first file to the second file of the second format without generating the second digital signature of the second file when the first file successfully passed at least one security check but the second format does not support digital signatures.

The processor may be configured to convert the first file to the second file of the second format without generating the second digital signature of the second file when the first file successfully passed at least one security check but the first file is associated with an invalid first digital signature.

The processor may be configured to convert the first file to the second file of the second format without generating the second digital signature of the second file when the first file successfully passed at least one security check but the first file is associated with a first digital signature of an unknown format.

The processor may be configured to copying to the non-quarantine sector at least a part of the first digital signature.

The processor may be configured to write to the non-quarantine sector information about at least a part of the first digital signature without copying to the at least part of the first digital signature to the non-quarantine sector.

The processor may be configured to convert the first file to the second file of the second format by converting the first file to an intermediate file of an intermediate format and convert the intermediate file of an intermediate format to the second file of the second format.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Signing and Validating a Digital Document

When the creator of a document wishes to sign the document he can decide to sign it. The signature is valid only for a specific version of the document. If the user later changes even a single bit in the signed document, the signature will be invalidated (while it is possible to create two documents that will yield the same digital signature, this is mathematically highly improbable—this is the corner stone of digital signatures).

In order to sign a document the signer has to obtain a digital certificate that will be recognized by the recipient of the document. The common way of doing that is by registering at a recognized certificate authorities (CA). The author of the document registers himself with the certificate authority and receives a set of private and public keys. Any document signed with this set will be authenticated by any recipient of document that trusts or recognizes the certificate authority that was used for signing.

Common certificate authorities are automatically recognized by most organizations. If necessary it is possible to modify the list of recognized certificate authorities according to the organization's needs. In addition, trust can be given from one authority to another, so if the organization has a trust relationship with CA1, and CA1 trusts CA2, then the organization will also trust CA2.

After obtaining the private-public key set from the CA, the author simply has to instruct the application that he is using in order to create the document to sign this document using his set of keys. This adds a small section of data that can be used to verify that the binary content of the file hasn't been altered since the time it was signed. The signature data contains information such as the certificate authority that was used, the public key, hash information about the file and additional meta-data such as the date of creation, name of the signer, etc.

The signature information that is embedded in the document is stored in different ways according to the exact format of the file.

In order to verify a signed file, the recipient needs to open the file in an application that supports this functionality. The application then reads the signature information and verifies that the hash information matches the content of the file. It also checks that the certificate authority mentioned in the file is recognized by the recipient.

Protecting from Malware by Performing Format Transformations

When an organization receives a document from customers, other vendors, or job candidates, it is faced with a dilemma From the business perspective, these documents need to be read by someone in the organization. However, when an employee opens a document from an external source he becomes susceptible to an array of potential attack vectors.

Malware can be delivered to a target in the organization in the form of a document that contains one of the following:
1) An exploit—a segment in the binary form of the document that is specifically designed to take advantage of a known vulnerability in software that is used to read or edit this document. For example, there are hundreds of known vulnerabilities in current and past versions of products such as Microsoft word, Adobe acrobat reader, etc. vulnerabilities that have been remediated in the latest version of the products are often made public and published in designated sites. These vulnerabilities are often still relevant because when dealing with large organizations some computers will not be kept 100% up to date with every software update that was published.
2) A malicious macro—Macros are small pieces of code written in scripting languages (such as Visual basic, Java script) that are embedded into a document and begin running when the document is loaded or a specific trigger occurs. Macros can be very powerful; they can invoke OS commands, activate and use other programs, read and write files, etc. A common practice with macros and scripts is to obfuscate them to prevent the reader from understanding the workings of the code. The main security problem with macros (or any other executable code) is that there is no known efficient way to predict what a code will do under every scenario (due to the NP Completeness of this problem). A small and apparently harmless code may contain within it a hidden malicious code, or can download additional malicious pieces of code when running
3) An embedded file that is either malicious or contains a malicious code—while the common policy for organizations is to block an email that contains an executable attachment, it is often possible to embed such an executable inside an innocent looking document and request the user to double click that when reading the document.

Transforming the document to another format in a way that disables those attack vectors by:
1) Recreating the document without the exploits
2) Removing macros based on a set of predefined rules—remove unsigned macros or all
3) Recursively processing embedded objects within the file and removing or processing them according to the security policy.

There may be provided a computer such as a server that may communicate with clients hosted on user computers.

The clients submit to the server files that should be processed, and the server returns the processed files back to the clients or delivers them to the destination directly (via SMB file share for example).

The server receives a file in one of the following formats: Office Word Document (doc, docx, docm), Excel document (xls, xlsx, xlsm), Powerpoint presentation (ppt, pptx, pptm), PDF or a mail message (as an S/MIME message). The server transforms the file to a different format (for example PDF->DOCX) that supports digital signatures. Optionally, the server may transform the document twice: to an intermediate format and back to the original (PDF->DOCX->PDF).

The problem occurs when such an anti-malware system receives a signed document (e.g PDF, office). The system needs to modify the file in order to apply the necessary anti-malware steps. This means that the resulting file will not be binary identical to the original signed document, thus breaking the trust relationship between the document creator and the recipient.

In order to solve the problem the server will remove the existing signature and sign the modified document using its own signing certificate. The recipient of the document will see that the document was verified by our system, and that will re-establish the trust (recipient trusts our system which verified and trusts the signer of the document).

When first deploying at a location the system will be assigned a trusted private-public key. This key will be used in order to sign every file that was processed by the system and contained a valid signature.

The server may be coupled to (or host) collection agents. The collection agents intercept incoming traffic, send it for analysis and transformations, and allow the processed file to pass onward to the next step in the chain. Examples for such collection agents are:
1) An agent that intercepts emails—incoming mail is usually processed in several stages. It is passed from the organization's firewall to the spam filter and then to the local mail exchange server. The users can then access their mailbox from their local exchange server. Our interception agent can placed as part of this chain (usually between the spam filter and the local mail server). When an email is received by the email agent it will be processed by the system and the processed product will be sent to the next stage.
2) An agent that intercepts FTP traffic—The usual setup for an organizational FTP consists of an FTP server that has an external address and can be accessed by trusted parties. The FTP server allows its users to upload or download files to designated folders in the server. These files are then accessible to internal users in the form of shared folders on file servers.
3) An agent that is deployed on the end-points and intercepts files coming from thumb drives or other USB peripheral devices. When a file is intercepted by one of those agents it is first sent to the main server for processing. The server will process the file and send the result (which could be the original file, a transformed version of the file, or nothing if the entire file need to be blocked) back to the collection agent.

The collection agent will pass the resulting file onward to the next stage.

The server works may perform the following steps for each received file:
1) Receive file from one of the clients.
2) Perform various static and dynamic security checks on the file. Static security checks look and the binary content of the file and detect things such as:
   i. A file that is from a format that is not allowed for the user.
   ii. A file that is incomplete, malformed or damaged.
   iii. A file that contains a known malware—malware that can be detected by an antivirus.
3) Dynamic analysis deploys the file on a special machine that allows it to run while monitoring its activity.
4) If the file fails one of the above checks it will be rejected and blocked.
5) If the incoming file contains a digital signature in one of the forms that is known by the system (e.g. digital signatures embedded in PDF or office documents), this signature is validated by following the validating steps. If the signature isn't valid then the file can be optionally blocked at this point or treated as a document that didn't contain any signature at all. If the signature is valid the set variable WasFileSigned=true. Store the original signature details in a database.
6) Transform and modify the file—in this step the digital file is modified. The transformations may include removing disallowed content, recreating headers and digital containers in the document, or transforming the file to from one format to another. Some example of transformations that help prevent a malware infection:
   i. Recreate the file from scratch while maintaining the content (copying text objects, images, etc. to the new document)
   ii. Remove macros from a document
   iii. Remove embedded OLE objects that contain disallowed content
7) If WasFileSigned=true AND the target format supports file signing AND the file was modified THEN remove the old signature and (re)sign the file using our internal signing certificate—in this stage we check if the original file was modified by our process. If the file was signed and is not binary identical to the original then the original signature is no longer valid. If the recipient tries to verify the file using the reader application he will see that the file signature isn't valid. In order to produce a valid signed file we need to strip the file of the original signature information, and add to it a new signature. The new signature will be based on our private-public key set, and will be based on the certificate authority that we used in order to issue this key set. The recipient will see that the file was signed by us (for example the signer would be "ReSec Technologies" and the meta-data would optionally contain also the original meta-data info).
8) As an optional element, the system could collect the information contained within the original signature (such as the original signer, date, original certificate authority and so forth) and store it in a separate file. This file additional text file could be sent along with the re-signed document and/or presented upon request from clients.
9) As another optional element, the system will store the original signed document in a special dedicated file store. This will enable clients to retrieve the original at a later date. Access to this file store could be limited only to specific users in the organization since the files contained in this store are not necessarily safe to use (because they have not been treated against potential malware in them).

Figure 1:
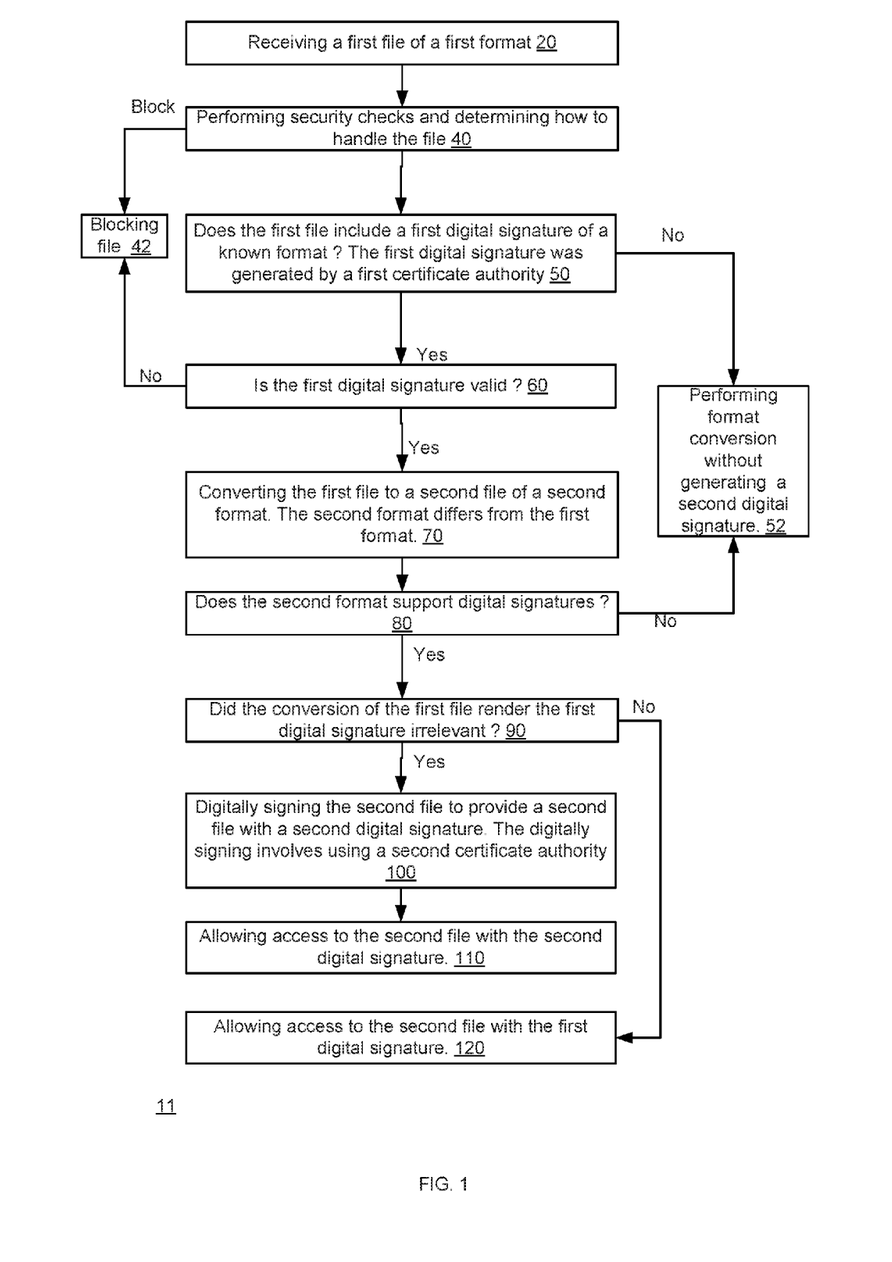
FIG. 1 illustrates a method according to various embodiments of the invention.

FIG. 1 illustrates method 11 according to an embodiment of the invention.

Method 11 may start by step 20 of receiving a first file of a first format. The term "first" is used to differentiate the file and the format from the file and the format after converting the file to another file of another format.

Step 20 may include intercepting traffic that includes the first file. The traffic may be intercepted by a collection agent.

Step 20 may be followed by step 40 of performing security checks and determining how to handle the first file.

For example—if the first file failed in one or more security checks the first file may be deleted (blocked—step 42), may be maintained in a quarantine section of the memory, and the like.

The security checks may be static and/or dynamic security checks.

Static security checks look at the binary content of the first file and detect things such as (i) the first file is from a format that is not allowed for the user; (ii) the first file that is incomplete, malformed or damaged; (iii) the first file contains a known malware—malware that can be detected by an antivirus.

Dynamic analysis deploys the first file on a special machine that allows it to run while monitoring its activity. The first file may be kept at the quarantined sector during the dynamic analysis.

If the first file fails one of the above checks it will be rejected and blocked—and the method stops at step 42.

If the first file successfully passes the security checks then step 40 may be followed by step 50 of checking if the first file includes a first digital signature of a known format. The first digital signature (is such exists) was generated by a first certificate authority.

If the answer is negative (the first file is not associated with a first digital signature or the first digital signature is not of a known format) then step 50 is followed by step 52 of performing a format conversion of the first file without generating a second digital signature. The outcome of the format conversion is a second file of a second format.

If the answer is positive then step 50 is followed by step 60 of checking if the first digital signature is valid.

If the first digital signature is not valid then step 60 is followed by step 42 of blocking the file.

If the first digital signature is valid then step 76 is followed by step 70 of performing a format conversion of the first file to provide a second file of a second format. The content of the second file may substantially equal the content of the first file. The conversion may delete malicious code or any part of the first file that was deemed to endanger the computer.

Step 70 may be followed by step 80 of checking whether the second format supports digital signatures (protecting the second file using digital signatures). If not—step 90 is followed by step 52.

If yes—step 80 is followed by checking (step 90) whether the conversion of the first file to the second file (step 70) render the first digital signature irrelevant.

For example—the first digital signature may become irrelevant when step 80 changes the content of the first file so that the first digital signature will indicate that the second file is invalid).

In no-step 90 may be followed by step 120 of allowing access to the second file with the first digital signature. In this case the second file and the first digital signature may be stored in the non-quarantine sector. It is noted that the first digital signature may or may not belong to the second file. If the first digital signature belongs to the second file then access to the second file is regarded as access to the first digital signature.

If yes then step 90 is followed by step 100 of digitally signing the second file to provide a second file with a second digital signature. The digitally signing involves using a second certificate authority. The second certificate authority may differ from the first certificate authority that digitally signed the first file. The second certificate authority may be hosted by the computer that executes method 10 or by another computer that is in communication with the computer that executed at least one step of steps 40, 50, 60, 70, 80 and 90.

Step 100 may be followed by step 110 of allowing access to the second file and the second digital signature. Step 110 may include or may be preceded by storing the second file and the second digital signature in the non-quarantine sector of the memory. It is noted that the second digital signature may or may not belong to the second file. If the second digital signature belongs to the second file then access to the second file is regarded as access to the second digital signature.

Figure 2:
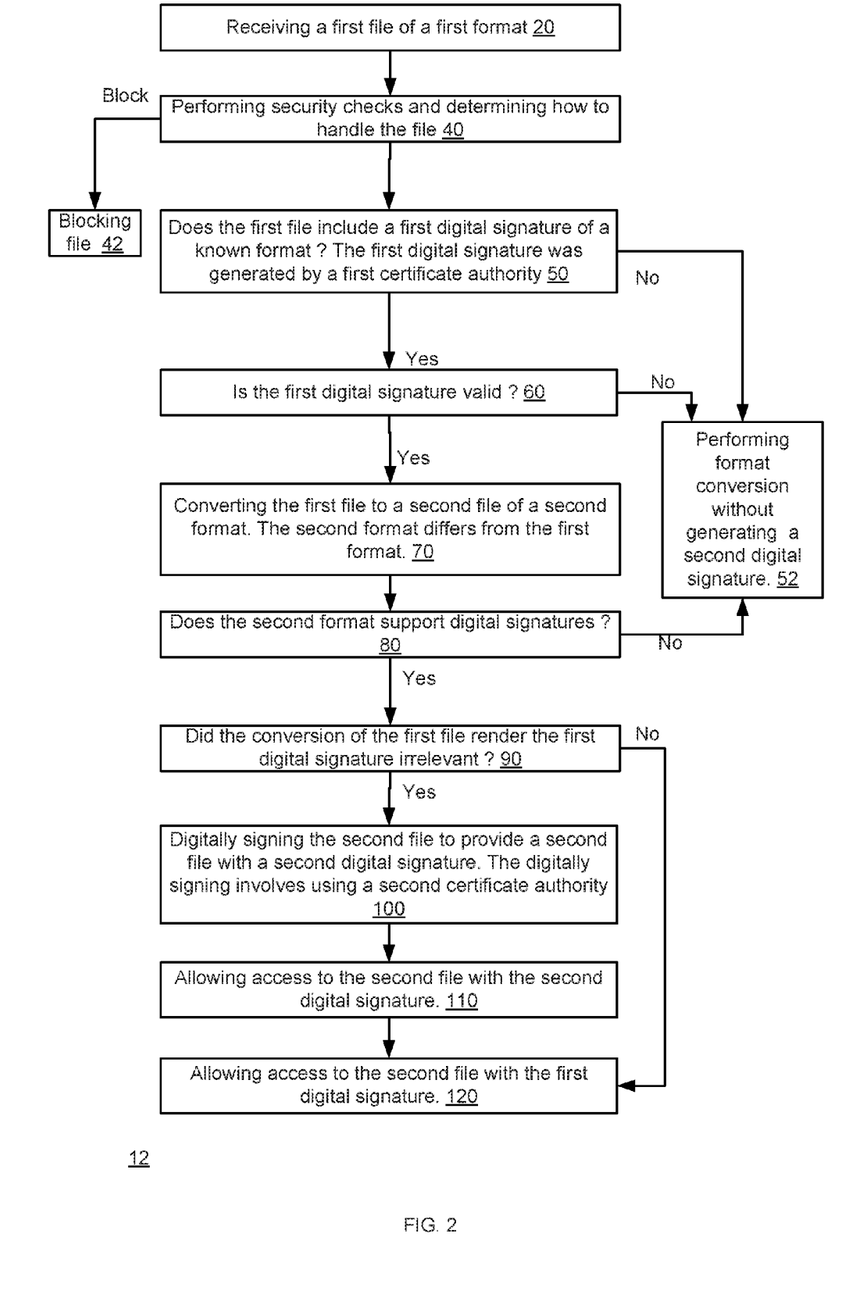
FIG. 2 illustrates a method according to various embodiments of the invention.

FIG. 2 illustrates method 12 according to an embodiment of the invention.

Method 12 differs from method 11 of FIG. 1 by jumping from step 60 to step 52 (instead of jumping to step 42) when the first digital signature is invalid. Accordingly—when the first digital signature is invalid—method 12 does not block the file (as in method 11) but treats the first file as not including a first digital signature—and converts the first file to the second file without generating a second digital signature.

Figure 3:
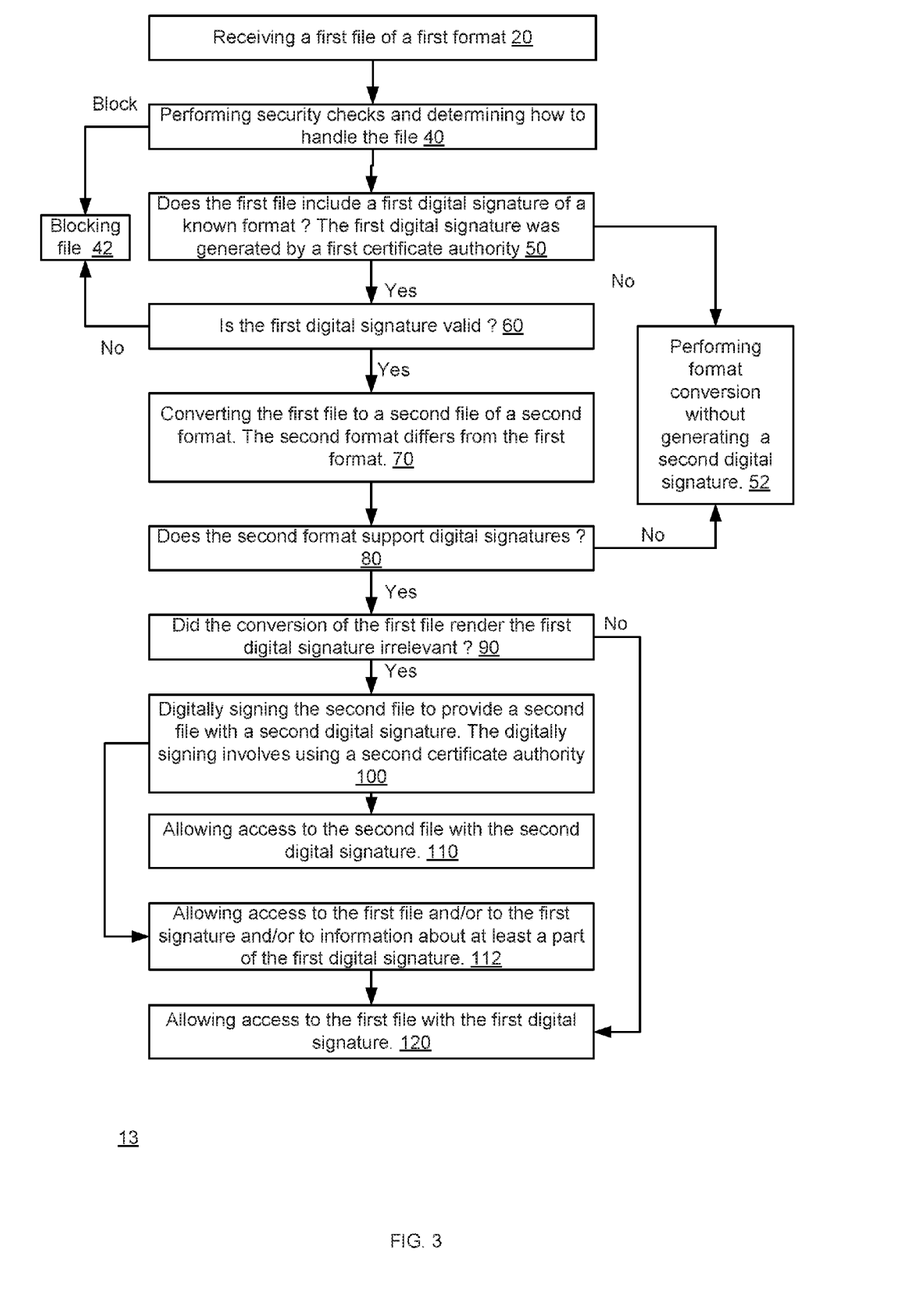
FIG. 3 illustrates a method according to various embodiments of the invention.

FIG. 3 illustrates method 13 according to an embodiment of the invention.

Method 13 differs from method 11 of FIG. 1 by including step 112. Step 112 may be preceded by step 100.

Step 112 includes allowing access to the first file and/or to the first signature and/or to information about at least a part of the first digital signature. The information about at least a part of the first digital signature may be stored in a non-quarantine sector while the first digital signature itself may be stored in the quarantine sector or in the non-quarantine sector.

Figure 4:
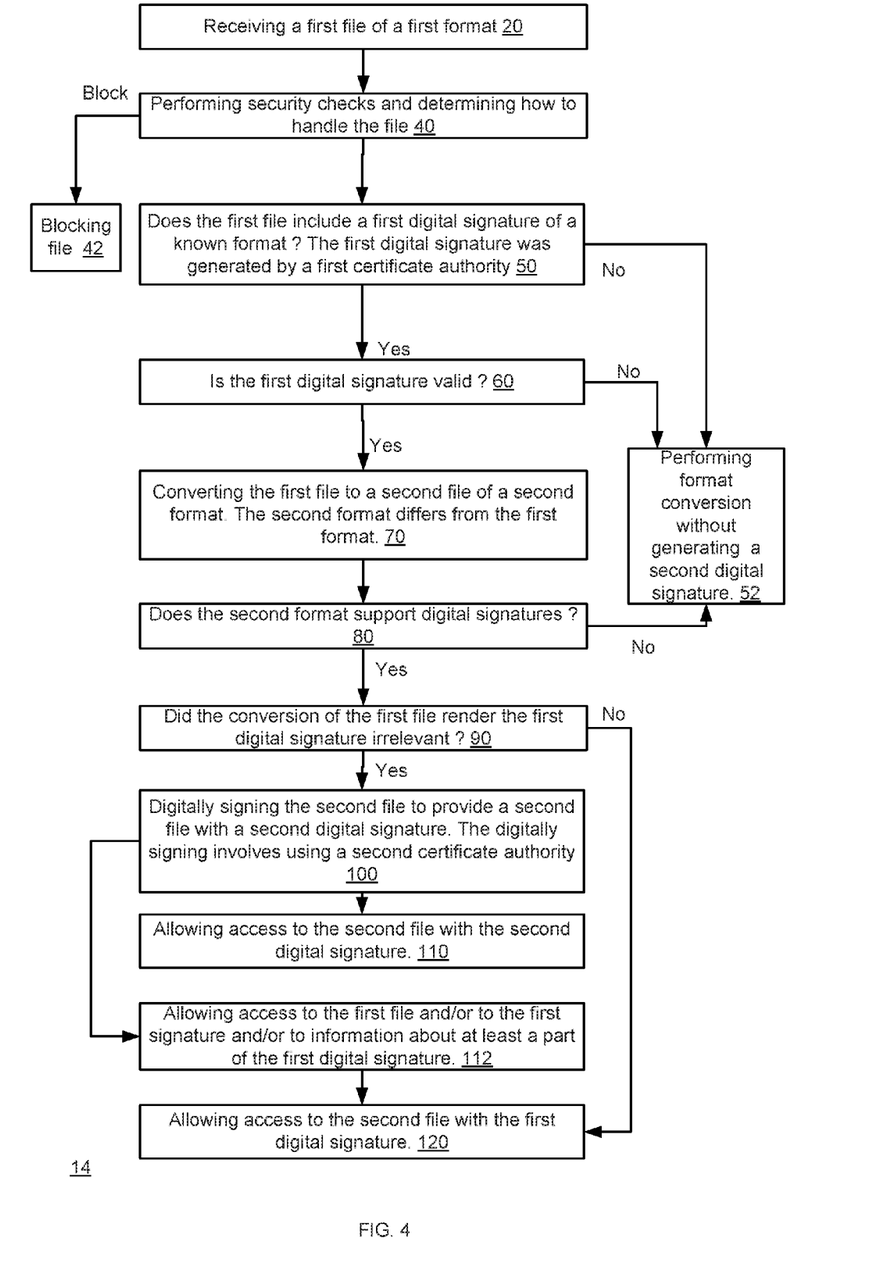
FIG. 4 illustrates a method according to various embodiments of the invention.

FIG. 4 illustrates method 14 according to an embodiment of the invention.

Method 14 differs from method 11 of FIG. 1 by including step 112. Step 112 may be preceded by step 100.

Step 112 includes allowing access to the first file and/or to the first signature and/or to information about at least a part of the first digital signature. The information about at least a part of the first digital signature may be stored in a non-quarantine sector while the first digital signature itself may be stored in the quarantine sector or in the non-quarantine sector.

Method 14 also differ from method 11 of FIG. 1 by jumping from step 60 to step 52 (instead of jumping to step 42) when the first digital signature is invalid. Accordingly—when the first digital signature is invalid—method 12 does not block the file (as in method 11) but treats the first file as not including a first digital signature—and converts the first file to the second file without generating a second digital signature.

Figure 5:
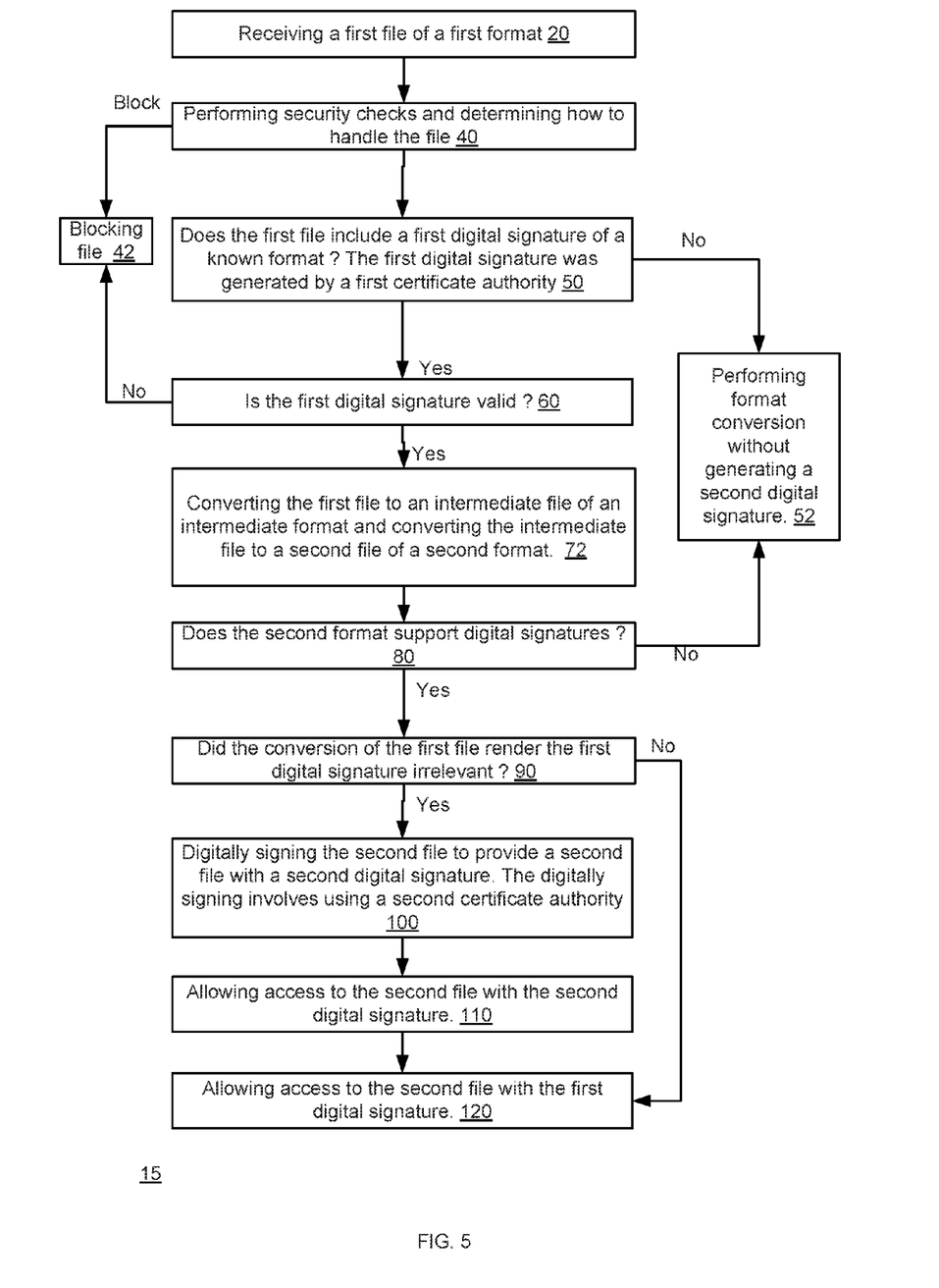
FIG. 5 illustrates a method according to various embodiments of the invention.

FIG. 5 illustrates method 15 according to an embodiment of the invention.

Method 15 differs from method 11 of FIG. 1 by including step 72 instead of step 70.

Step 72 converting the first file to an intermediate file of an intermediate format and converting the intermediate file to a second file of a second format. In this case the first and second formats may be the same or may differ from each other.

Figure 6:
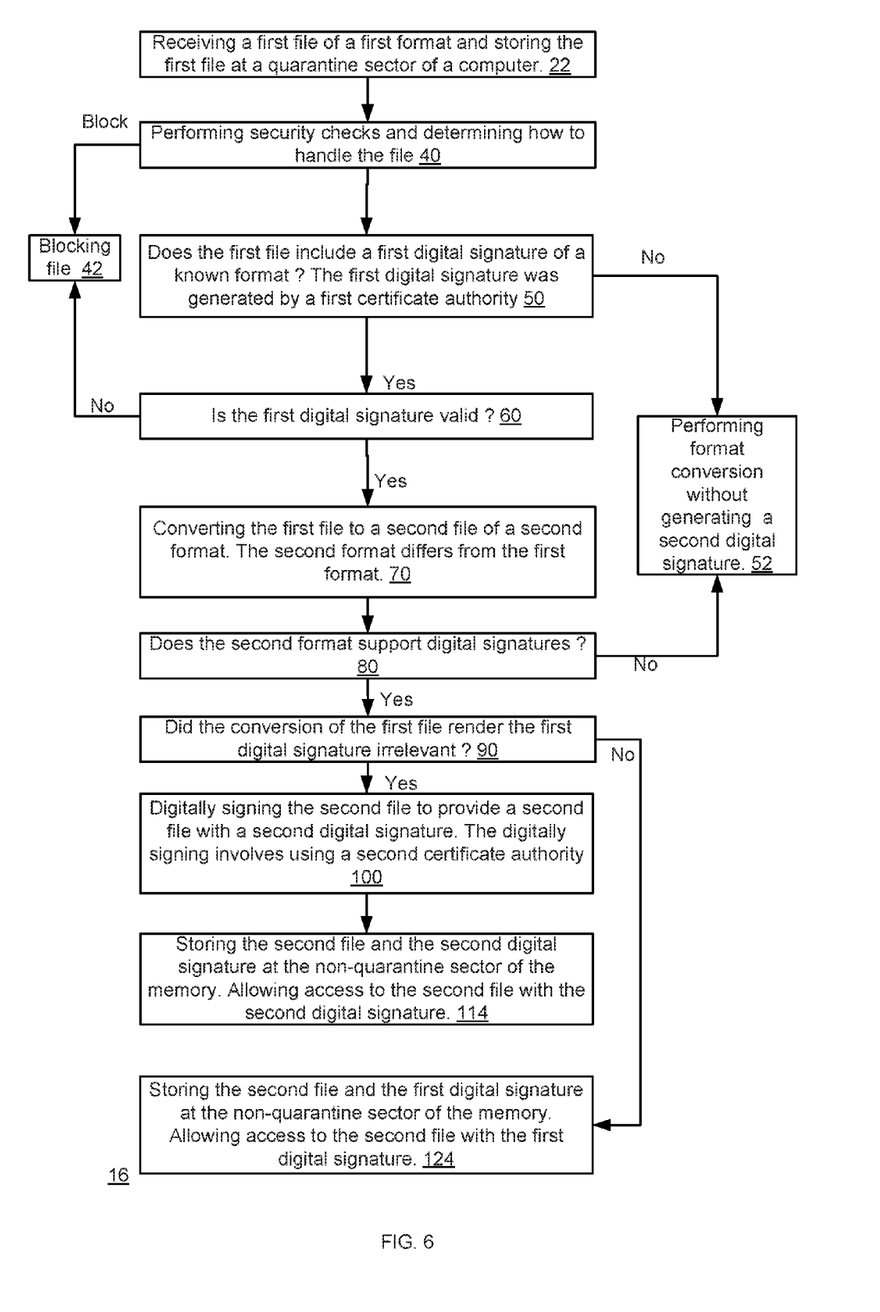
FIG. 6 illustrates a method according to various embodiments of the invention.

FIG. 6 illustrates method 16 according to an embodiment of the invention.

Method 16 differs from method 11 of FIG. 1 by providing examples of where the first file, second file, first digital signature and second digital signature are stored.

Step 20 is replaced by step 22 of receiving a first file of a first format and storing the first file at a quarantine sector of a computer.

Step 110 is replaced by step 114 of storing the second file and the second digital signature at the non-quarantine sector of the memory. Allowing access to the second file with the second digital signature.

Step 120 is replaced by step 124 of storing the second file and the first digital signature at the non-quarantine sector of the memory. Allowing access to the second file with the first digital signature.

Figure 7:
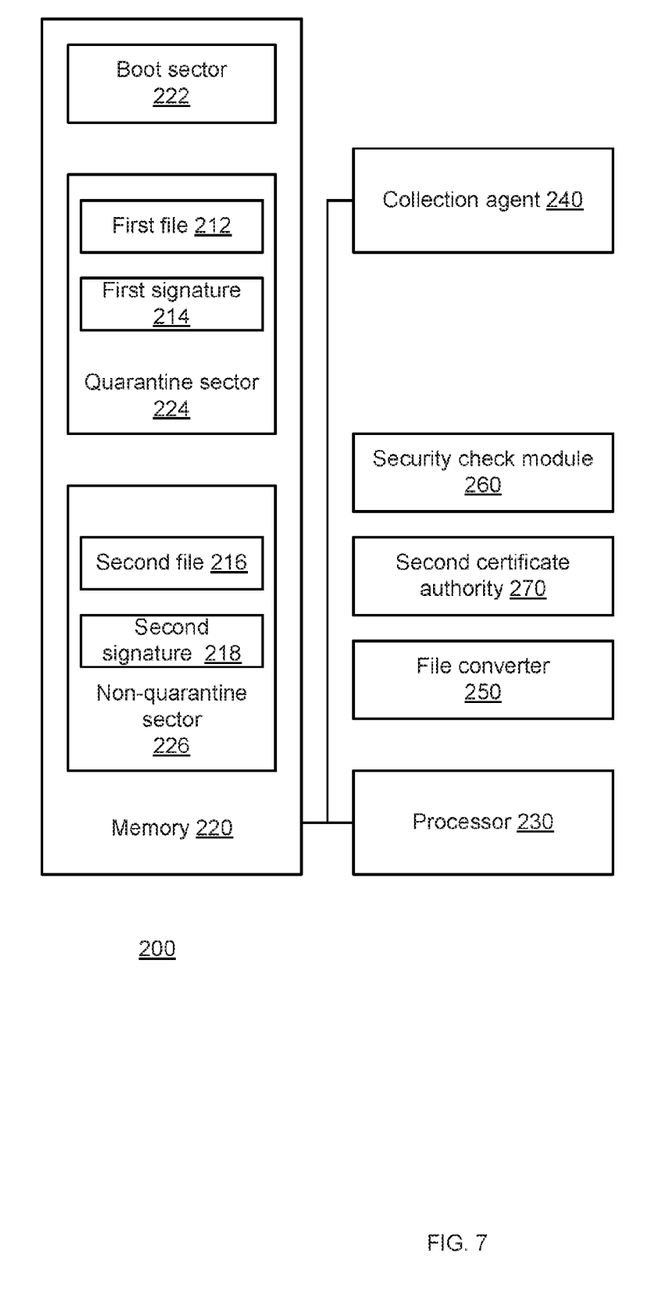
FIG. 7 illustrates a computer and various data structures according to various embodiments of the invention.

FIG. 7 illustrates a computer 200 and various data structures according to various embodiments of the invention.

Computer 200 may include memory 220 and processor 230.

Computer 200 may be one or more servers, one or more desktop computers, one or more laptop computers, and the like. Computer 200 may be located within a cloud computerized environment, but this is not necessarily so.

Memory 220 may include boot sector 222, quarantine sector 224 and non-quarantine sector 226.

Quarantine sector 224 is isolated from the boot sector 222 and the non-quarantine sector 226. Code in the quarantine sector 224 is prevented from performing write actions on other memory sectors of the memory.

Processor 230 is a hardware processor. It may be a general purpose processor, an image processor, a hardware accelerator and the like.

FIG. 7 illustrates various modules such as collection agent 240, security check module 260, second certificate authority 270 and file converter 250. Each one of these module may be hosted by computer, may be executed by processor 230 or may include both hardware and software components.

Collection agent 240 may be any of the collection mentioned above.

Security check module 260 is configured to perform one or more security checks (for example—see step 40 of FIGS. 1-6).

File converter 250 is configured to convert a first file of a first format to a second file of a second format (for example—see steps 70 and 72 of FIGS. 1-6).

Second certificate authority 270 is configured to generate the second digital signature of the second file (for example—see step 100 of FIG. 1-6).

Processor 230 may also be configured to control the processing of the first file. For example—processor 230 may be configured to control the execution of either one of methods 11-16 (for example—see steps 50, 60, 80 and 90 of FIGS. 1-6).

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for file conversion, the method comprises:
receiving a first file in a computer; wherein the first file is of a first format; wherein the computer has a memory having a boot sector, a quarantine sector and a non-quarantine sector; storing the first file at the quarantine sector; wherein the quarantine sector is isolated from the boot sector and the non-quarantine sector, where code in the quarantine sector is prevented from performing write actions on other memory sectors of the memory;
checking whether the first file fulfills a set of criteria that comprise: (a) the first file is associated with a valid first digital signature that was generated by a first certificate authority and is of a known format; (b) the first file is to be converted to a second file of a second format that supports digital signatures; and (c) the first file successfully passed at least one security check;
when the first file fulfills the set of criteria then converting the first file to the second file of the second format;
generating, by a second certificate authority, a second digital signature of the second file when the first file fulfills the set of criteria; and
storing the second file and the second digital signature at the non-quarantine sector.

2. The method according to claim 1, comprising converting the first file to the second file of the second format without generating the second digital signature of the second file when the first file successfully passed at least one security check but the second format does not support digital signatures.

3. The method according to claim 1, comprising converting the first file to the second file of the second format without generating the second digital signature of the second file when the first file successfully passed at least one security check but the first file is associated with an invalid first digital signature.

4. The method according to claim 1, comprising converting the first file to the second file of the second format without generating the second digital signature of the second file when the first file successfully passed at least one security check but the first file is associated with a first digital signature of an unknown format.

5. The method according to claim 1 comprising copying to the non-quarantine sector at least a part of the first digital signature.

6. The method according to claim 1 comprising writing to the non-quarantine sector information about at least a part of the first digital signature without copying to the at least part of the first digital signature to the non-quarantine sector.

7. The method according to claim 1 wherein the converting of the first file to the second file of the second format comprises converting the first file to an intermediate file of an intermediate format and converting the intermediate file of an intermediate format to the second file of the second format.

8. A non-transitory computer readable medium that once executed by a computer causes the computer to execute the steps of:
receiving a first file in the computer; wherein the first file is of a first format; wherein the computer has a memory having a boot sector, a quarantine sector and a non-quarantine sector; storing the first file at the quarantine sector; wherein the quarantine sector is isolated from the boot sector and the non-quarantine sector, where code in the quarantine sector is prevented from performing write actions on other memory sectors of the memory;
checking whether the first file fulfills a set of criteria that comprise: (a) the first file is associated with a valid first digital signature that was generated by a first certificate authority and is of a known format; (b) the first file is to be converted to a second file of a second format that supports digital signatures; and (c) the first file successfully passed at least one security check;
when the first file fulfills the set of criteria then converting the first file to the second file of the second format;

generating, by a second certificate authority, a second digital signature of the second file when the first file fulfills the set of criteria; and storing the second file and the second digital signature at the non-quarantine sector.

9. The non-transitory computer readable medium according to claim 8, that stores instructions for converting the first file to the second file of the second format without generating the second digital signature of the second file when the first file successfully passed at least one security check but the second format does not support digital signatures.

10. The non-transitory computer readable medium according to claim 8, that stores instructions for converting the first file to the second file of the second format without generating the second digital signature of the second file when the first file successfully passed at least one security check but the first file is associated with an invalid first digital signature.

11. The non-transitory computer readable medium according to claim 8, that stores instructions for converting the first file to the second file of the second format without generating the second digital signature of the second file when the first file successfully passed at least one security check but the first file is associated with a first digital signature of an unknown format.

12. The non-transitory computer readable medium according to claim 8 that stores instructions for copying to the non-quarantine sector at least a part of the first digital signature.

13. The non-transitory computer readable medium according to claim 8 that stores instructions for writing to the non-quarantine sector information about at least a part of the first digital signature without copying to the at least part of the first digital signature to the non-quarantine sector.

14. The non-transitory computer readable medium according to claim 8 wherein the converting of the first file to the second file of the second format comprises converting the first file to an intermediate file of an intermediate format and converting the intermediate file of an intermediate format to the second file of the second format.

15. A computer, comprising: a memory having a boot sector, a quarantine sector and a non-quarantine sector; wherein the quarantine sector is isolated from the boot sector and the non-quarantine sector, where code in the quarantine sector is prevented from performing write actions on other memory sectors of the memory; a processor; wherein the memory is configured to receive a first file and store the first file at the quarantine sector; wherein the first file is of a first format; wherein the processor is configured to:

(i) check whether the first file fulfills a set of criteria that comprise: (a) the first file is associated with a valid first digital signature that was generated by a first certificate authority and is of a known format; (b) the first is to be converted to a second file of a second format that supports digital signatures; and (c) the first file successfully passed at least one security check;

(ii) when the first file fulfills the set of criteria then convert the first file to the second file of the second format;

(iii) generate, using a second certificate authority, a second digital signature of the second file when the first file fulfills the set of criteria; and wherein the memory is configured to store the second file and the second digital signature at the non-quarantine sector.

16. The computer according to claim 15, wherein the processor is configured to convert the first file to the second file of the second format without generating the second digital signature of the second file when the first file successfully passed at least one security check but the second format does not support digital signatures.

17. The computer according to claim 15, wherein the processor is configured to convert the first file to the second file of the second format without generating the second digital signature of the second file when the first file successfully passed at least one security check but the first file is associated with an invalid first digital signature.

18. The computer according to claim 15, wherein the processor is configured to convert the first file to the second file of the second format without generating the second digital signature of the second file when the first file successfully passed at least one security check but the first file is associated with a first digital signature of an unknown format.

19. The computer according to claim 15 wherein the processor is configured to copying to the non-quarantine sector at least a part of the first digital signature.

20. The computer according to claim 15 wherein the processor is configured to write to the non-quarantine sector information about at least a part of the first digital signature without copying to the at least part of the first digital signature to the non-quarantine sector.

21. The computer according to claim 15 wherein the processor is configured to convert the first file to the second file of the second format by converting the first file to an intermediate file of an intermediate format and convert the intermediate file of an intermediate format to the second file of the second format.

* * * * *